United States Patent

Atkinson et al.

[15] 3,697,984

[45] Oct. 10, 1972

[54] COMPUTER-ALARM INTERFACE SYSTEM

[72] Inventors: Roger F. Atkinson; Richard H. Parr, Jr.; Edward A. Weil, all of Nashville, Tenn.

[73] Assignee: Clendenin Inventors Limited Partnership, Silver Spring, Md.

[22] Filed: May 23, 1969

[21] Appl. No.: 827,216

[52] U.S. Cl. ....................340/408, 340/409, 340/413

[51] Int. Cl. ........................G08b 25/00, G08b 29/00

[58] Field of Search....340/408, 409, 213.1, 413, 412

[56] References Cited

UNITED STATES PATENTS

| | | | |
|---|---|---|---|
| 2,883,651 | 4/1959 | Akerlund | 340/413 |
| 2,985,871 | 5/1961 | Bemis | 340/413 |
| 3,091,756 | 5/1963 | Lowman | 340/413 |
| 3,189,882 | 6/1965 | Ward | 340/413 |
| 3,278,920 | 10/1966 | Sargent | 340/413 |
| 3,256,517 | 6/1966 | Saltzberg | 340/408 |
| 3,423,748 | 1/1969 | Hansen | 340/409 |
| 3,457,559 | 7/1969 | Hubbard | 340/213.1 |

*Primary Examiner*—Thomas B. Habecker
*Attorney*—Hurvitz, Rose & Greene

[57] ABSTRACT

A computer-alarm interface system interconnects conventional leased telephone line, polarity reversal alarms at multiple protected premises to a digital computer. The system, installed to function with a time-sharing computer equipped for communications, notifies police for other appropriate authorities of the nature and location of an alarm, trouble or tamper condition. Each protected premises is associated with a respective module at a central station which registers normal, alarm, or telephone line trouble conditions at the premises, and optionally provides tamper protection. The modules are continuously monitored for changes in conditions at their associated protected premises and transmit coded information pertaining to the nature and location of these changes to the computer. The latter provides a written record of this information at the office of the appropriate authority and also checks the alarm system to assure that the information received by the computer is correct.

A tamper-protection circuit employed with or without the computer includes a code tone or pulse transponder located at the protected premises and selectively triggered by an interrogation code tone or pulse from the module. Failure to receive the specified code tone or pulse over the telephone lines when triggered from the module location signifies tampering at the protected premises.

Another feature of the system is the provision of circuitry at the module location which permits condition indicators or lamps to have two active states: in one state the condition is indicated as not having been reported to the authorities; in the second state the condition is indicated as persisting but having been reported.

18 Claims, 4 Drawing Figures

INVENTORS
ROGER F. ATKINSON,
RICHARD H. PARR, Jr.
& EDWARD A. WEIL

Hurwitz, Rose & Greene
ATTORNEYS

INVENTORS
ROGER F. ATKINSON,
RICHARD H. PARR, Jr.
& EDWARD A. WEIL

Hurvitz, Rose & Greene
ATTORNEYS

INVENTOR
ROGER F. ATKINSON,
RICHARD H. PARR, Jr.
& EDWARD A. WEIL

Hurvitz, Rose & Greene

ATTORNEYS

INVENTORS
ROGER F. ATKINSON,
RICHARD H. PARR, Jr.
& EDWARD A. WEIL

Hurwitz, Rose & Greene
ATTORNEYS

COMPUTER-ALARM INTERFACE SYSTEM

BACKGROUND OF THE INVENTION

The present invention relates to alarm systems, and more particularly to a computer-alarm interface system which interconnects a digital computer and a leased-line alarm system.

Present day burglar, fire, and similar purpose alarm systems are generally divided into two categories: those which operate nearby or local alarms, and those which signal a central location (generally over a leased telephone line) of the nature and location of the alarm. The latter are called central station alarm systems. Obviously central station systems, because of their centralized reporting nature, provide more rapid notification of police or fire departments than a local alarm. In the case of a holdup alarm, a central system is mandatory because of the potential danger to personnel and customers when a local alarm sounds in the presence of armed holdup men.

In prior art central station systems there is often a considerable time delay between the arrival of the alarm signal at the central station and the reporting of the alarm to the proper authorities. This happens because upon receipt of an alarm signal the central location operator must stop whatever else he is doing, take notice of the alarm indicator, mentally decode its significance, and telephone the police department or other appropriate authority. If central office personnel are busy with another alarm report or otherwise occupied, an even further delay (as much as a minute) may occur before the police department receives the call. The police department must then record the call and plan the appropriate action, i.e., select the proper men and cars in the appropriate area, and dispatch them, generally by radio, to the location of the alarm. At times when multiple alarm signals are received at the central station, it may take as long as 5 minutes to report an alarm to the police, and an additional 5 minutes for the police to arrive at the location of the alarm.

Therefore, it is one object of the present invention to reduce the number of human steps required to service a central alarm station by increasing the number of those steps that are handled automatically.

At most central alarm stations reception of an alarm signal from one or more of the protected remote premises results in actuation of an alarm indicator associated with those premises. The indicator is usually an audible signal accompanied by a lamp, meter, or paper tape with ink marks on it. The central station operator must notify the authorities, as described above, and then deactuate at least the audible indicator. Where alarm signals from several protected premises are received at or about the same time, the operator often becomes confused as to which alarms have been reported, which have been rectified, etc., and consequently the operator is not certain as to the appropriateness of leaving a particular alarm indication actuated. If the indicator remains actuated when in fact the alarm condition has been reported, subsequent alarm information for those premises does not produce any noticeable indication at the central station. Further, the alarm indication may be mistakenly deactuated when the condition has not been reported.

It is therefore another object of the present invention to provide a circuit which eliminates confusion on the part of a central alarm station operator when multiple alarm signals are received.

Law enforcement agencies across the country are increasingly utilizing data processing equipment to speed up the collection and dissemination of data relating to wanted and missing persons, motor vehicle registration, license numbers, patrol car locations, and logging of events with associated statistical analysis. These data processing applications have made for more effective law enforcement in the face of rising crime rates.

The governments in most medium and large size cities in the United States already own or have access to a computer which is either capable of or is presently being utilized for communications; that is, remote terminals such as cathode ray tube displays, teletype machines, typewriters, etc., are connected by leased telephone lines or wires to various offices of the city government, including the police station. Several cities have shown an interest in connecting alarms to their computer and in turn to the police and fire stations. This would require the computer to accept alarm reports as input data. Such a computer may either be a large machine, time-shared with other functions such as accounting, or a small machine dedicated to alarm reporting. Appropriate devices for this purpose do not exist in the prior art. Conceptually, a system is needed which will accept alarm signals received from protected premises over leased telephone lines, apply the alarm signals to the computer memory, search the computer's memory for the location and nature of that particular alarm condition and for any special instructions associated with it, decide appropriate action based on any number of preprogrammed factors, and report this entire block of information to the police and fire department automatically.

It is therefore another object of the present invention to provide a central station alarm system which is compatible with existing local governmental computer installations for expediting response by appropriate government authorities to remote alarm conditions.

SUMMARY OF THE INVENTION

In accordance with the principles of the present invention, when an alarm condition occurs on any of the protected premises, voltage on a leased telephone line reverses polarity. The other end of each telephone line is terminated at the central station in a module, each protected premises having one module and one set of telephone lines associated therewith. Each module detects polarity reversals on its associated telephone lines and provides coded information identifying the remote location and nature of the alarm or other condition. This information is passed to equipment common to all of the modules. The common equipment identifies any module reporting a condition. The identity of the module along with the nature of the condition, whether alarm, line trouble, or return to normal, is then reported to the computer. The computer takes the information, searches the identity code in its memory to procure the location of the protected premises producing the condition and any special instructions associated therewith, and decides appropriate action. The computer transmits this entire block of data, containing the name and address of the location producing the condition as well as any special instructions, over a phone line or other wire to the police or fire station where it is reported on an indicating device such as a CRT display or typewriter. After the computer has searched the memory and determined that the telephone line and indicating device are properly functioning, it sends exactly the same information back to the module from which the information was originally received. If the module does not receive the identical information which it sent out within 1 or 2 seconds, it allows a malfunction indicator in the common equipment to be actuated, thus alerting the operator that the system has malfunctioned. A flashing light at the appropriate module indicates to the operator the nature and location of the condition which was incorrectly reported. The operator can then notify the appropriate authority of this condition, and manually reset the malfunction indicator. Thus, in the unlikely event of equipment failure, the system detects both the failure and the part which has failed and automatically re-commences functioning as a manual system.

By combining the proven reliability of leased line central alarm systems with the computer's ability to rapidly and accurately make decisions and retrieve and deliver large volumes of information to the police or fire station, the alarm-computer interface system of the present invention uniquely provides more information of greater accuracy in less time than could be possible in prior art alarm systems.

Additional optional protection for high risk, maximum security installations is provided by a tone or digital pulse transponder system. The common equipment generates, at random intervals, an interrogating tone or pulse which is gated through the modules to their respective leased telephone lines. This interrogating tone or pulse is received by a transponder unit located at the protected premises. The transponder then sends back a uniquely coded combination of tones and/or pulses which are decoded in the module. The module is arranged to indicate "Tamper" status if the correct transponder code does not arrive in response to transmission of the interrogating tone or pulse, or if the correct tone or pulse arrives when not solicited by the interrogating tone or pulse. In order to deceive a module provided with this optional tamper-proof protection, a criminal must substitute both the relatively simple d.c. signal and the very complex transponder tone or pulse code, with appropriate detection and timing circuits, on the telephone lines.

One feature of the present invention is particularly advantageous even to non-computerized alarm systems. More particularly, upon receipt of an alarm signal from any protected premises, an alarm indicator light at the module associated with those premises is caused to cyclicly flash on and off. The operator, upon notifying the proper authority of the location of the alarm, presses a reset button at the module which causes the alarm indicator light to cease flashing but remain in a steady on condition until the cause of the alarm is rectified and the indicator light de-energized completely.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DETAILED DESCRIPTION OF THE PREFERRED EMBODIMENT

Figure 1A:
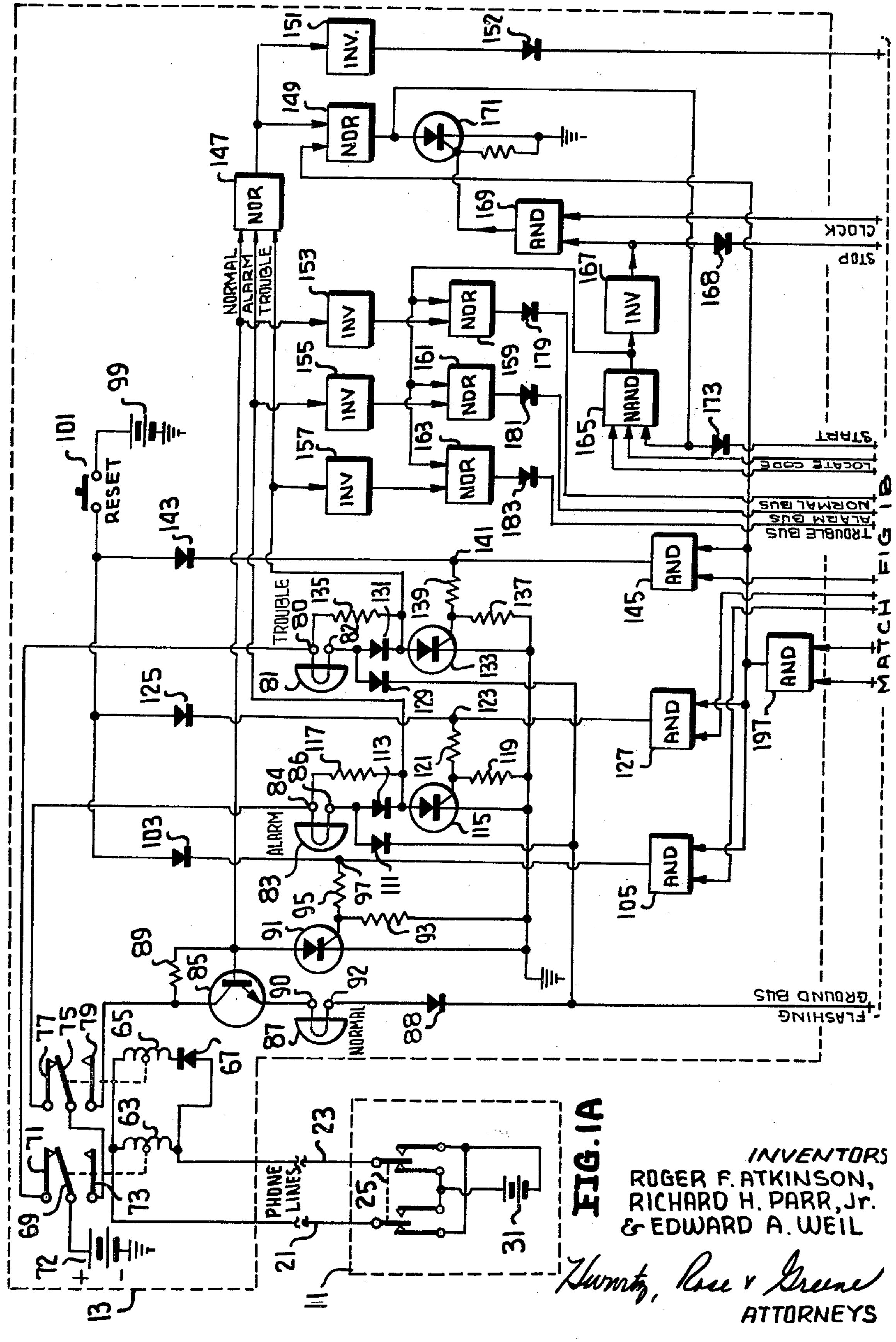
FIGS. 1*a* and 1*b* constitute a single schematic and partial block diagram of a central alarm system of the present invention.
Figure 1B:
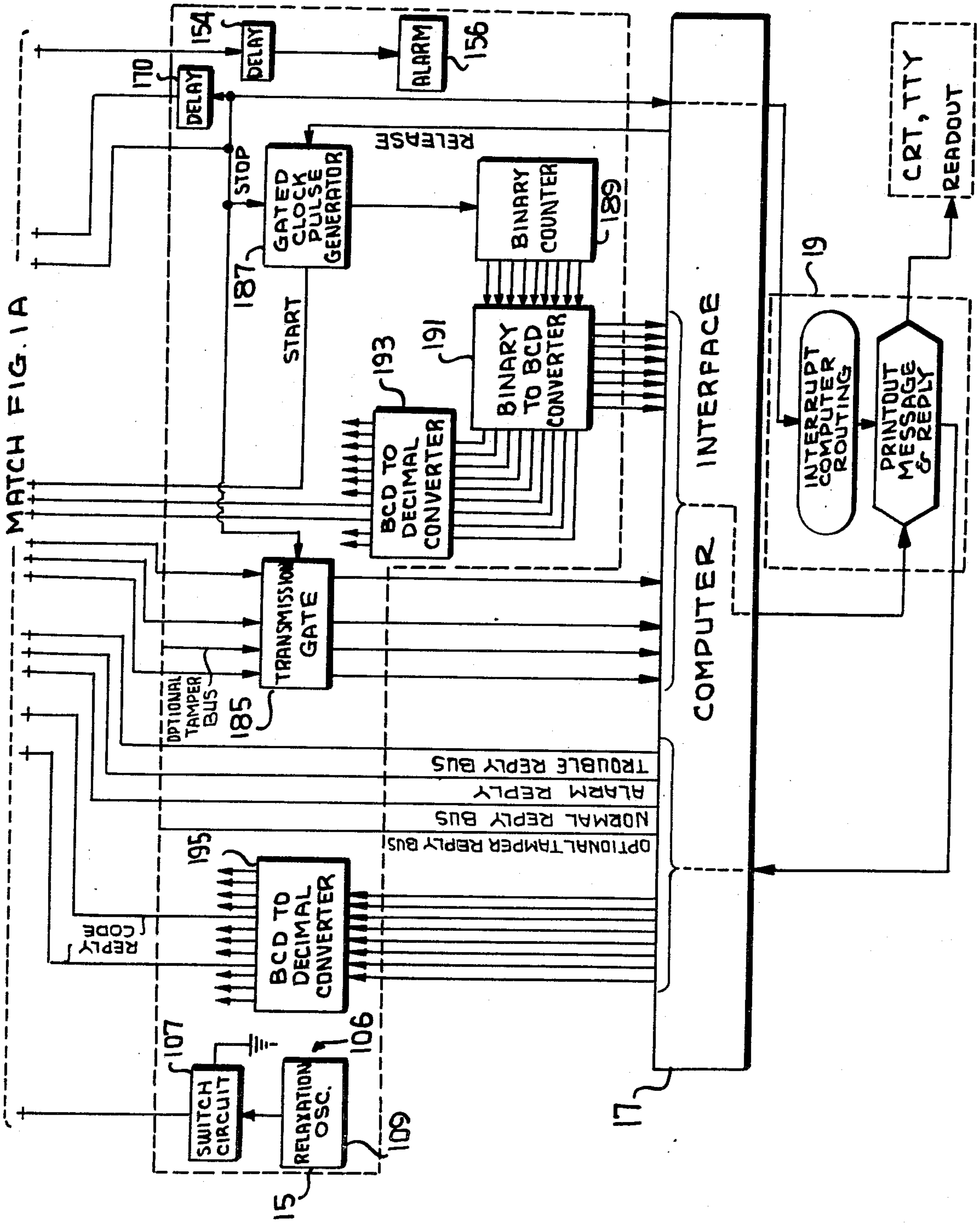

Referring now to FIGS. 1*a* and 1*b*, the system of the present invention comprises five basic component subsystems, namely: the various protected premises represented in the drawings by one such protected premises 11; the various modules associated with respective ones of said premises, represented in the drawing by a single module 13 associated with premises 11; common equipment 15 which is interconnected to all of the various modules and whose interconnections with module 13 are illustrated as representative of all of its modular interconnections; computer interface 17; and computer 19. It is to be understood that multiple protected premises 11 and their respective modules 13 are serviced by common equipment 15, computer interface 17 and computer 19.

Interconnection between remotely located protected premises 11 and its associated module 13 is provided by a pair of wires 21 and 23 of a leased telephone line or similar circuit. Protection of premises 11 proceeds on the assumption of a polarity reversal system. More specifically, it is assumed that when the voltage on wire 21, at module 13, is positive relative to the voltage on wire 23, an alarm condition exists at the protected premises; when the voltage on wire 21 is negative relative to the voltage on wire 23 the protected premises are normal; and when the voltage across wires 21 and 23 is zero there is a telephone line fault which must be repaired if the system is to function properly. The mechanism for producing these voltages across wires 21 and 23 is schematically represented by the contacts of a double pole, double throw relay 25 and an associated d.c. voltage supply 31. Of course a true representation of the protection circuitry at premises 11 would include various window switches, door switches, photoelectric beams, etc. for burglar protection temperature sensitive switches for fire protection, and buttons, foot switches, etc. for holdup protection; however, these types of protection circuits are conventional and need not be reproduced herein. It should be noted that any alarm sensing system can be readily connected to a polarity reversal circuit at nominal expense.

The contacts of relay 25 have two positions, normal and alarm. They are shown in the normal position. When the contacts are in the normal position, d.c. supply 31 applies a negative voltage to wire 21 and a positive voltage to wire 23. When the contacts are in alarm position, d.c. supply 31 applies a positive voltage to wire 21 and a negative voltage to wire 23. When wires 21 and 23 are open or shorted, the voltage from d.c. supply 31 does not reach module 13, providing effectively zero volts d.c. across wires 21 and 23.

Figure 2:
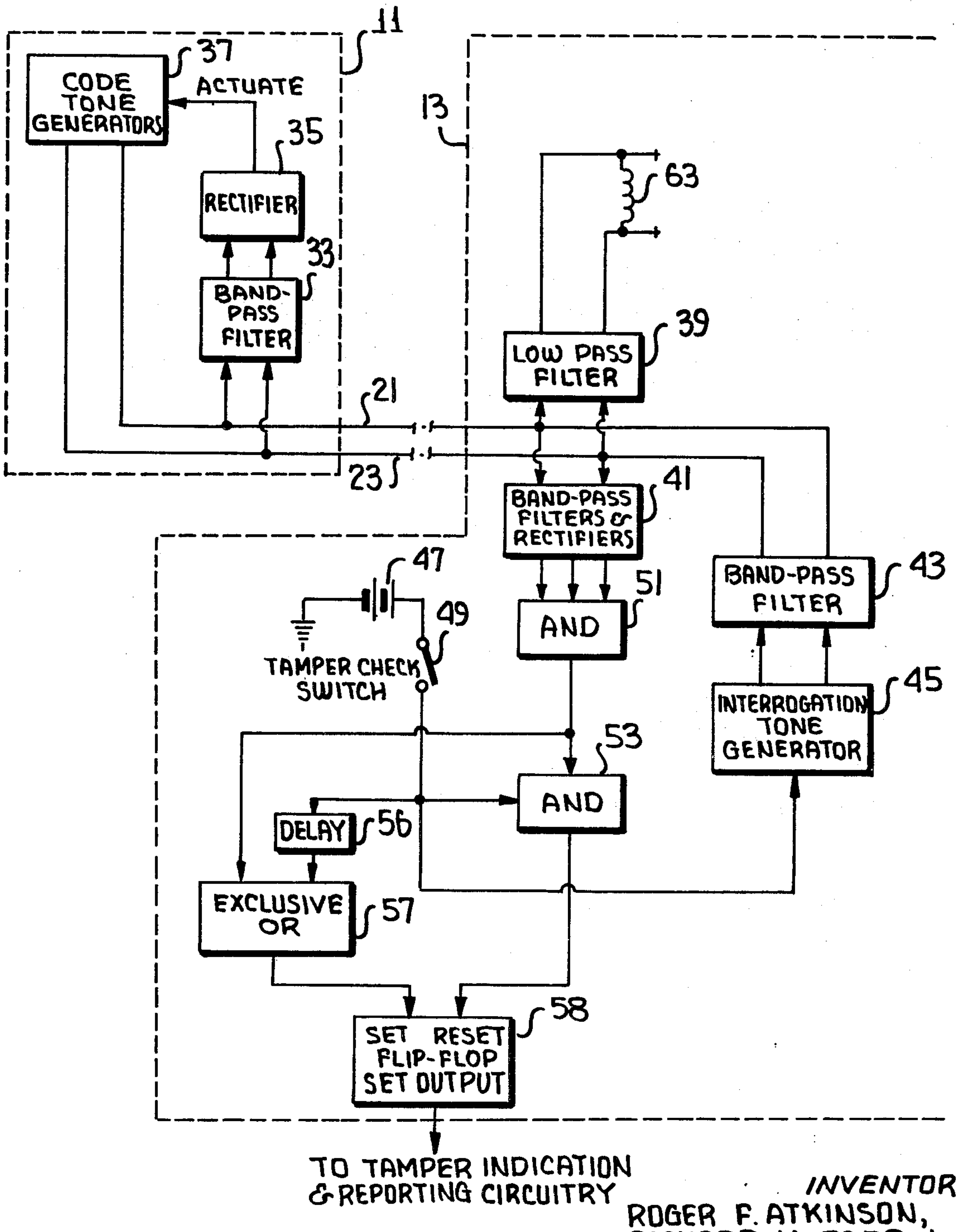
FIG. 2 illustrates in schematic form an optional modification for the system in FIGS. 1*a* and 1*b*.

As part of an optional feature of the present invention, there may also be located at remote premises 11 part of a tamper protection circuit comprising a bandpass filter 33, rectifier 35 and a plurality of voltage-actuated tone generators represented integrally by the numeral 37, all illustrated in FIG. 2.

FIG. 2 schematically illustrates all of the components required for the tamper protection circuit, indicating also the various sub-systems in which respective portions of the tamper circuitry are preferrably, though not necessarily, physically located. Bandpass filter 33 is connected across wires 21 and 23, passing only tone signals lying within its passband. In practice, filter 33 is tuned to the frequency of a predetermined interrogation tone generated in module 13 or alternatively at common equipment 15 as described in detail subsequently. Tone signals within the bandpass of filter 33 are rectified by rectifier 35 and applied as a d.c. actuate signal to tone generators 37. The latter comprise a plurality, for example three, of audio tone generators of conventional type which are normally non-oscillatory but which respond to an actuate signal to produce their respective tones. The particular tone combination produced by tone generators 37 comprises a code which is preferably different for each of the protected premises. The tones are combined and applied across wires 21 and 23.

Still referring to FIG. 2, at module 13 the wires 21 and 23 are connected to the input side of a low-pass filter 39, to the input side of bandpass filters and rectifiers 41, and to the output side of a bandpass filter 43. Bandpass filter 43, like filter 33 is tuned to the interrogation tone frequency and receives the interrogation tone signal at its input side from interrogation tone generator 45. The latter may be a single audio oscillator which is normally non-oscillatory and is actuated by a voltage applied thereto from d.c. source 47 upon closure of a switch 49. Filter 43, tone generator 45, source 47, and tamper check switch 49 may alternatively be located in common equipment 15 from which location they would serve all of the modules and protected premises in common. Also part of the optional tamper protection circuit in module 13 are bandpass filters and rectifiers 41, a pair of AND gates 51 and 53, and EXCLUSIVE OR gate 57, and a flip-flop 58. In addition, circuitry for tamper indication and transfer to the computer is provided, as described subsequently. It is to be understood that various pulse codes or other signal codes may be employed instead of tones for the interrogation and coded tone signals. In such case the filter circuits would be replaced by other appropriate signal discrimination circuits.

Bandpass filters and rectifiers unit 41 comprises plural bandpass filters, one each tuned to a respective tone frequency provided by tone generators 37. Unit 41 also includes plural rectifier circuits, one each associated with a respective one of the plural bandpass filters, which provide d.c. voltages whenever a tone is passed by their associated bandpass filter. It is assumed that a three-tone code is employed in the illustrated tamper protection circuit so that three filters and three rectifiers are employed in unit 41.

The three rectifier output signals from unit 41 are applied to AND gate 51 which responds to the simultaneous presence of all three of these signals to provide an output signal which is applied to both EXCLUSIVE OR gate 57 and AND gate 53. Closure of tamper check switch 49 applies a second input signal to each of gates 53 and 57. If either but not both input signals are applied to EXCLUSIVE OR gate 57, the flip-flop 58 is set. If both of these signals are simultaneously applied to AND gate 53 the flip-flop 58 is reset. Application of the voltage from source 47 to EXCLUSIVE OR gate 57 is delayed as necessary by element 56 to permit transmission of the interrogation and code tones back and forth on wires 21 and 23.

The set output of flip-flop 58, indicating a tamper condition, is indicated and transferred to the computer in exactly the same way that an alarm condition is indicated and transferred. Circuitry identical to that hereinafter explained for indication and transfer of an alarm condition may be located in the module 13 along with the aforementioned tamper protection circuitry. This indication and transfer circuitry is identical to elements 83, 84, 86, 111, 113, 115, 117, 119, 121, 123, 125, 127, 155, 161 and 181 to be described below in reference to alarm condition indication and information transfer.

An alternate embodiment of the tamper protection circuit would continuously provide garbled tones or other noise signals on the telephone lines except when true interrogation and reply tones or pulses are present. This embodiment will be more fully described subsequently.

Low pass filter 39 has an upper cut-off frequency which lies below the interrogation tone generator frequency and all of the code tones produced by tone generator 37. Consequently only the d.c. signals representing the NORMAL, TROUBLE, and ALARM conditions of premises 11 are passed through filter 39. Referring now back to FIGS. 1*a* and 1*b*, the d.c. signals so passed are applied directly across a relay coil 63 and across the series connected combination of a relay coil 65 and diode 67. Diode 67 is polarized to permit current flow through coil 65 only when wire 23 is positive relative to wire 21. Coil 63 passes current for either voltage polarity appearing across the wires.

Relay coil 63 has associated therewith a relay arm 69, a normally closed contact 71 and a normally open contact 73. Relay coil 65 has associated therewith a relay arm 75, a normally closed contact 77 and a normally open contact 79. A source of positive d.c. voltage 72 is connected to relay arm 69, and normally open contact 73 of relay 63 is connected to arm 75 of relay 65.

Normally closed contact 71 of relay 63 is connected to terminal 80 of a TROUBLE indicator lamp 81; normally closed contact 77 of relay 65 is connected to terminal 84 of an ALARM indicator lamp 83; normally open contact 79 of relay 65 is connected to the collector of an NPN transistor 85, the emitter of which is connected to terminal 90 of a NORMAL indicator lamp 87. A bias resistor 89 is connected between the collector and base of transistor 85 and a silicon-controlled rectifier (SCR) 91 has its anode connected to the base of transistor 85 and its cathode connected to ground. The gate electrode of SCR 91 is connected to ground through a resistor 93 and to junction 97 through a resistor 95. Junction 97 can receive reset signals to trigger SCR 91 from either of two sources: one source comprises a series circuit including positive d.c. voltage source 99, reset pushbutton switch 101, and diode 103; the other source comprises the output signal from an AND gate 105. The former source is manually actuated and is employed when module 13 is generally not employed in conjunction with a computer or when the computer or common equipment 15 fails; the output signal from AND gate 105 is derived automatically as the result of data processing operations to be described in detail subsequently.

A second terminal 92 of NORMAL indicator lamp 87 is connected to a flashing ground circuit 106 through a diode 88. Flashing ground circuit 106 comprises a switch circuit 107, for example an SCR, triggered by a relaxation oscillator 109. Switch circuit 107 periodically provides a current path between ground and terminal 92 of lamp 87 at the frequency of the relaxation oscillator. This circuit is located in the common equipment 15 and is shared by all modules.

A second terminal 86 of ALARM indicator lamp 83 is connected to the anodes of two diodes 111 and 113. The cathode of diode 111 is periodically grounded by flashing ground circuit 106; the cathode of diode 113 is connected to the anode of an SCR 115, the cathode of which is grounded. A bias resistor is connected between terminal 84 and the anode of SCR 115. The gate electrode of SCR 115 is connected to ground through resistor 119 and to a junction 123 through resistor 121. Junction 123 is connected to receive either of two reset signals: a manual reset signal is applied from positive d.c. voltage source 99 via reset switch 101 and diode 125; an automatic reset signal is provided at junction 123 by AND gate 127.

The actuation circuit for TROUBLE indicator lamp 81 is similar to that for ALARM indicator lamp 83. Terminal 82 of lamp 81 is connected to the anodes of a pair of diodes 129, 131. The cathode of diode 129 is connected to flashing ground circuit 106 and the cathode of diode 131 is connected to the anode of an SCR 133, the cathode of which is grounded. A resistor 135 is connected between terminal 80 of lamp 81 and the anode of SCR 133. The gate electrode of SCR 133 is grounded through a bias resistor 137 and to circuit junction 141 via resistor 139. Junction 141 is connected to receive either of two reset signals: a manual reset signal is applied from source 99 via switch 101 through diode 143; an automatic reset signal is applied directly from AND gate 145.

The portion of the circuitry in module 13 thus far described, absent AND gates 105, 127 and 145, and containing the tamper protection circuitry only as an option, can be employed without any computer interconnection and provides an improved central alarm system. This may be illustrated by the following description of the three possible operational modes of the module.

When premises 11 is normal, as indicated by relay 25 in its normal condition, wire 21 is more negative than wire 23 and both relay coils 63 and 65 pass current, causing relay arms 69 and 75 to contact their respective normally open contacts 73 and 79. A positive d.c. voltage is applied from source 72 through the contacts of both relays to the collector of transistor 85 and through resistor 89 to the base of transistor 85. SCR 91 is non-conductive at this time so that the positive voltage at the base of transistor 85 triggers the latter to provide current flow therethrough and through NORMAL lamp 87 to flashing ground circuit 106. As a result the NORMAL lamp flashes on and off, attracting the attention of the operator at the central alarm station where module 13 is located. The operator, upon seeing that all is normal at premises 11 then presses switch 101, actuating the manual reset circuit connected to the gate electrode of SCR 91. SCR 91 fires, shorting the base of transistor 85 to ground, turning off the transistor and blocking current flow to lamp 87. The module remains in this condition, with none of lamps 81, 83, 85 energized, until a change in condition occurs at premises 11.

Assume now that an alarm condition occurs at premises 11, indicated by relay 25 in its alarm condition. In this condition the voltage on wire 21 is positive relative to the voltage on wire 23, causing current to flow through relay coil 63; however, current flow through coil 65 is blocked by diode 67 which is polarized oppositely to the potential across wires 21 and 23. Under these conditions relay arm 69 remains at normally open contact 73 and arm 75 returns to its normally closed contact 77. This change in state of relay coil 65 has two primary effects: first, the d.c. voltage from source 72 is removed from the anode of SCR 91 and from the collector of transistor 85 cutting off both the transistor and the SCR and preventing actuation of NORMAL indicator lamp 87; second, the d.c. voltage from source 72 is applied to terminal 84 of ALARM lamp 83, and also to the anode of SCR 115 through voltage dropping resistor 117. Since SCR 115 has not been triggered it remains off at this time and current flow through lamp 83 proceeds through diode 119 to flashing ground circuit 106; therefore lamp 83 flashes on and off at a rate determined by oscillator 109. The flashing ALARM lamp attracts the operator's attention, and after identifying the location of the alarm (premises 11) the operator notifies the police or other appropriate authority. The operator then presses pushbutton switch 101 to actuate the manual reset signal for the ALARM lamp. As a result SCR 115 is triggered via diode 125 and resistor 121 and shorts terminal 86 of lamp 83 to ground via diode 113. The steady ground dominates the flashing ground to provide a steady actuation of ALARM lamp 83 as opposed to the flashing actuation appearing prior to notification of the police. The steady ALARM lamp indication remains until appropriate action at premises 11 returns the premises to its normal condition as indicated by returning the contacts of relay 25 to their normal positions. Line trouble, indicated by failure of voltage on wires 21 and 23 would also effectively remove the ALARM condition from module 13 and extinguish lamp 83. In either case, voltage from source 72 is removed from both lamp 83 and SCR 115, cutting off current flow through both of these components.

Assume now that telephone line trouble occurs, for example a line break or short. The voltage across wires 21 and 23 is zero and neither of relay coils 63 and 65 is energized. Voltage from source 72 is applied via relay arm 69 and normally closed contact 71 to terminal 80 of TROUBLE lamp 81 and in turn through voltage-dropping resistor 135 to the anode of SCR 133. SCR 133, not having been triggered at this time, remains non-conductive and the only current path through lamp 81 is provided through diode 129 to the flashing ground circuit 106. The TROUBLE light is thus caused to flash on and off drawing the attention of the central station operator who in turn notifies the proper authority and then depresses reset switch 101. This triggers SCR 133 which now provides a direct current path to ground for the TROUBLE lamp 81, the latter remaining steadily on until the line trouble is corrected and one or both of relay coils 63 and 65 is energized.

The important feature of the operational sequences described above is the two active states of ALARM lamp 83 and TROUBLE lamp 81. In one active state (flashing) the lamp indicates to the operator that the indicated condition has not yet been reported to the authorities. In the second active state (steady) the lamp indicates that the indicated condition has been reported but still persists. This feature eliminates confusion on the part of the operator when multiple premises have simultaneous alarm or trouble conditions. Instead of trying to remember which conditions were reported, as required by the prior art, the operator need only observe the active condition of the lamp to determine whether or not a report has been made.

As discussed above, indicator lamps and circuitry similar to that provided for the alarm and trouble condition may also be provided for the tamper condition at module 13. Reset switch 101 would interact with the tamper condition circuitry in the same manner.

Continuing now with a description of module 13 in so far as it is inter-related with a computer, the anodes of SCR's 91, 115 and 133 are connected to respective input terminals of a three-input NOR gate 147 which provides an output signal only when the voltage from anode to cathode across all three of these SCR's is substantially zero. If tamper protection is employed as described below, NOR gate 147 would have four input signals, one of which would originate from an SCR anode associated with the tamper indicator lamp. Since d.c. source 72 is connected in circuit with one of these three SCR's at all times, one SCR must be conductive (triggered on) before the voltages across all three SCR's can be substantially zero and NOR gate 147 can provide its output signal. This output signal is applied as an input signal to a two-input NOR gate 149 and to a binary logic inverter 151. Inverter 151, like all inverters described hereinbelow, provides a positive voltage (binary one) output signal in response to substantially zero voltage (binary zero) input signal, and no signal (binary zero) in response to a positive (binary one) input signal. The output signal from inverter 151 is passed through diode 152 to the common equipment 15 where it is delayed (for 2 seconds, for example) by delay element 154 and applied to an audible alarm 156 (for example a buzzer, bell, etc.)

The anodes of SCR's 91, 115 and 133 are also connected to input terminals of respective inverters 153, 155 and 157, the output signals from which are applied as input signals to respective two-input NOR gates 159, 161, and 163. Once again, an additional inverter and NOR gate would be employed if the tamper protection feature is used. The other input signal for each of these NOR gates comprises the output signal from a three-input NAND gate 165 which provides a positive output signal (binary one) when at least one of its input signals is zero voltage (binary zero). One input signal for NAND gate 165 comprises the output signal from NOR gate 149; the other two input signals are binary LOCATE CODE signals received from common equipment 15 and described in detail subsequently.

The output signal for NAND gate 165 is also applied to inverter 167, the output signal from which is applied as an input signal to a two-input AND gate 169 and also as a STOP signal via diode 168 to common equipment 15 where it performs a number of functions, to be described subsequently. In addition, the STOP signal is passed through a delay element 170 (on the order of 100 microseconds) in equipment 15 whereby it becomes a CLOCK signal and is returned to module 13 where it is applied as the second input signal to AND gate 169. The output signal from AND gate 169 is applied to the gate electrode of an SCR 171, the anode of which receives the output signal from NOR gate 149 and the cathode of which is grounded. The output signal from NOR gate 149 is also applied via diode 173 to common equipment 15 as a START signal to initiate a function to be described below. The second input signal to NOR gate 149 is a signal received from AND gate 197.

The output signals from NOR gates 159, 161 and 163 are passed through respective diodes 179 and 181 and 183 as the NORMAL BUS, ALARM BUS AND TROUBLE BUS respectively and are applied as input signals to a signal transmission gate 185 in common equipment 15. A TAMPER BUS may also be applied to gate 185 if the tamper protection feature is used. The gate signal for transmission gate 185 comprises the STOP signal provided by inverter 167. Any one of the denominated status bus signals, if present, can be passed through gate 185 to the computer interface 17 whenever a STOP signal is applied to gate 185.

The STOP signal is also applied to a gated clock pulse generator 187 which is part of common equipment 15. Clock pulse generator 187 also receives the START signal from NOR gate 149 as an input signal, and a RELEASE signal from computer interface 17 as another input signal. The output signal of generator 187 comprises a train of pulses which are applied to and counted by a binary counter 189. The train of pulses is enabled by the presence of a start signal, inhibited upon receipt of a STOP signal, and resumes operation upon receipt of a RELEASE signal.

THE BINARY count present in counter 189 at any instant of time is applied to a binary-to-binary coded decimal converter 191 which supplies a binary coded decimal (BCD) number representing the count in binary counter 189. This BCD number is applied to the computer interface 17 and also to a BCD-to-decimal converter 193 which provides the LOCATE CODE signals to be applied to NAND gate 165.

The configurations of converters 191 and 193 and counter 189 depends upon the number ($n$) of modules being serviced by common equipment 15. If $n$ is 10 or less, counter 189 has four or fewer bits and is gated to spillover after every $n$ counts; converter 191 provides a four bit output signal in BCD format representing a single decade; and converter 193 comprises a matrix having n possible output signals, only one of which is present at any time in accordance with the existing count in counter 189; in this case only one LOCATE CODE signal would be applied to NAND gate 165 which in turn would be a two-input gate. If $n$ is greater than 10 but less than 100, counter 189 has $x$ bits such that $2^{x-1}$ is greater than $n$ and is arranged to spillover after every $n$ counts; converter 191 provides two four bit numbers in BCD format, one number having a weight of 10 and the other having a weight of one; converter 193 is a matrix providing two groups of output signals, each group having ten possible output signals with one group having a weight of 10 and the other having a weight of unity. In this latter example, if the count in counter 189 were 35, the signals from converter 193 would comprise the third signal in the tens decade and the fifth signal in units decade. These signals are applied as LOCATE CODE signals to the module designated number 35 as long as the count in counter 189 remains at count 35. Preferrably counter 189 and converter 191 comprise part of a single integrated circuit for each decade.

It may be seen therefore that clock pulse generator 187, counter 189 and converters 191 and 193 operate as a module scanner, applying the appropriate LOCATE CODE signals to each module once during each count cycle, no two modules receiving LOCATE CODE signals at the same time. The scanner is held in standby condition, with generator 187 off, until a START signal is generated.

The STOP signal which occurs when a module requesting service is reached by the scanner, is passed to the computer interface 17 from which it is applied to the computer 19 as an instruction to interrupt whatever routine the computer is performing so that it may receive information regarding a condition change at premises 11. Interruption is not necessarily immediate but rather depends upon predetermined priorities of computer functions which are programmed into the computer. Upon interruption, this computer receives from the computer interface the BCD number representing the module in which a condition change has occurred and the status bus condition for that module. The computer then searches its memory for the geographic location of the numbered module in question and provides a written message in alpha-numeric form at the office of the proper authority, the written message containing the location of the problem, the nature of the problem and any special instructions the computer may be programmed to produce at this time, as well as decisions based on preprogrammed information.

The computer also sends back to the common equipment 15 via interface 17 exactly the same data which was transmitted to the computer, namely a status bus signal (denominated TROUBLE REPLY BUS, ALARM REPLY BUS, or NORMAL REPLY BUS or a TAMPER REPLY BUS if the tamper protection circuit is employed) and a BCD number representing the module reporting the condition in question. The BCD number is applied to a BCD-to-decimal converter 195 located in common equipment 15 and of the same general type as converter 193 described above. Assuming a two-decade converter, the two output signals from converter 195 are applied to a two-input AND gate 197 at the appropriately numbered module, the output signal from which is applied as an input signal to each of three two-input AND gates 105, 127, and 145. An additional AND gate would be provided for the tamper indicator circuit if the tamper protection feature is used. The second input signals for these AND gates are provided by respective ones of the NORMAL REPLY BUS, ALARM REPLY BUS, and TROUBLE REPLY BUS. These AND gates, as described above, provide automatic reset signals to respective junctions 97, 123, and 141 to trigger respective SCR's 91, 115 and 133 and convert respective lamps 87, 83 and 81 from flashing to steady actuation.

To assure a proper understanding of the present invention, the operational sequences occuring in response to all three possible conditions at premises 11 will be described in detail. Assume premises 11 is first placed in its normal mode in which, as described above, transistor 85 is conductive, NORMAL lamp 87 is flashing, and SCR 91 is off. A positive voltage is thus applied to NOR gate 147 and inverter 153 from the anode of SCR 91. This voltage deactuates NOR gate 147, removing the input signals from inverter 151 and NOR gate 149. The latter applies the START signal to the anode of non-conductive SCR 171, to NAND gate 165, and to clock pulse generator 187 which begins to generate pulses, thereby activating the scanner circuitry count cycle.

The positive signal applied to inverter 153 removes the inverter output signal from NOR gate 159; however, since the LOCATE CODE signals are not applied to NAND gate 165 at this time the latter provides an output signal which inhibits NOR gate 159. Consequently, the NORMAL BUS is not yet provided to the computer.

When the scanner circuit count reaches the number designated for module 13 the LOCATE CODE signals are applied to NAND gate 165. As a result, NAND gate 165 is deactuated removing the input signal from NOR gate 159 to provide the NORMAL BUS at transmission gate 185. In addition, inverter 167 now provides the STOP signal which is applied to AND gate 169, clock pulse generator 187 and transmission gate 185. AND gate 169 remains off temporarily, until the delay of the STOP signal through element 170 is completed to permit application of the CLOCK signal to AND gate 169 along with the STOP signal. Before the CLOCK signal becomes active, the STOP signal inhibits clock pulse generator 187 to prevent further counting in the scanner beyond the number assigned to module 13, and also actuates transmission gate 185 to permit passage of the NORMAL BUS to computer interface 17.

After the delay period of element 170 the CLOCK signal actuates AND gate 169 which triggers SCR 171, grounding the anode of the latter and removing the START signal from clock pulse generator 187 and NAND gate 165. Without the START signal applied thereto, the clock pulse generator cannot begin supplying output pulses, even after the STOP signal is removed therefrom, unless the START signal is reapplied and a RELEASE signal is received from the computer signifying that the data sent to the computer has been processed. The START signal may be applied to generator 187 by another module requesting service, but the generator remains off until released by the computer. With removal of the START signal from NAND gate 165, the latter is reactuated, turning off NOR gate 159 and inhibiting the NORMAL BUS which will already have been processed at computer interface 17. Reactuation of NAND gate 165 also de-energizes the STOP signal which deactuates AND gate 169 and prevents further status bus transmission through transmission gate 185.

The computer, as described above, processes the NORMAL BUS along with the BCD identification code for module 13 from converter 191, and returns a NORMAL REPLY BUS to AND gate 105 along with a BCD code identifying module 13 to converter 195. In addition, the computer after processing the required information, applies a RELEASE BUS to clock pulse generator 187. This releases the scanner circuit to recommence counting if a START signal is applied to generator 187 from one of the modules. If no START signal is present, the scanner remains in standby condition. The REPLY CODE signals are applied to AND gate 197, and if, as assumed here, module 13 was correctly identified by the information supplied the computer by converter 191, the output signal from AND gate 197 actuates AND gate 105 to apply a reset signal at junction 97. This triggers SCR 91, turning off lamp 87 and providing substantially zero voltage at the anode of SCR 91. This zero voltage appears at NOR gate 147 which is now re-actuated and applies an output signal to inverter 151. The inverter output signal is therefore removed from delay element 154, which for example may be a pulse width discriminator which does not permit passage of signals therethrough unless they are on the order of 2 seconds wide or wider. If, as assumed here, the scanner can cycle through all of the module counts in less time than the delay period of element 154, alarm 156 does not receive a signal during the short period of time that inverter 151 provides an output signal.

Actuation of AND gate 197 by the appropriate reply code for module 13 also inhibits NOR gate 149, removing the voltage from the anode of SCR 171 and cutting off the latter. In this condition, SCR 171 is readied so that the next actuation of NOR gate 149 produces the START signal.

If the number supplied to the computer by converter 191 along with the NORMAL BUS is not correct (that is, if the wrong module is identified), the number supplied by the computer to converter 195 will not actuate AND gate 197 in module 13 but rather will do so in some other module which is not awaiting an automatic reset. Consequently AND gate 105 is not actuated, SCR 91 is not triggered, lamp 87 remains flashing, and most importantly NOR gate 147 remains off. This causes the output signal from inverter 151 to remain on for a period in excess of the delay of element 154. After the delay provided by element 154 the audible alarm 156 is actuated, informing the operator that the system has malfunctioned to the extent that a status bus signal is originating from a module other than that which has been identified to the computer. The flashing NORMAL light at module 13 indicates the source of the trouble to the operator who then takes appropriate action pursuant thereto.

If the status (NORMAL, ALARM, TROUBLE or TAMPER) information transferred to the computer is incorrect but the number of the module whose status is in question is correct, the following considerations come into play. NOR gate 149 is deactuated by the output of AND gate 197; therefore, while an incorrect status reply fails to reactuate NOR gate 147, NOR gate 140 will be de-actuated, thus causing the START signal to reappear. This re-initiates the transfer of the status of module 13 to the computer which again replies to the common equipment. If the status is incorrect again the transfer is repeated and the flashing status lamp at the module indicates where the problem is. Alarm 156 will attract the operator's attention to the fact that a problem does exist.

Assuming once again that the source of the NORMAL BUS was properly identified and that inverter 151 was inhibited before actuation of alarm 156, it is also to be noted that the re-actuation of NOR gate 147, as caused by the firing of SCR 91, de-actuates NOR gate 149 to turn off SCR 171 which is thus reset and readied to provide the voltage for the START signal thereacross the next time NOR gate 149 is actuated. This cannot occur as long as premises 11 is not changed from its NORMAL condition. Module 13 thus remains with its START, STOP, and CLOCK signals de-energized until a change in condition occurs at premises 11. The scanner continues to cycle if another module activates the START BUS, but the LOCATE CODE signal has no effect at NAND gate 165 as long as the START signal from this particular module remains de-energized. The START signal thus acts as a priming signal for NAND gate 165 and is only provided when there is a change in condition at premises 11, or when an incorrect status is reported along with the correct reply code.

Assume now that an alarm condition develops at premises 11. As described above voltage from source 72 is removed from the NORMAL lamp circuit, cutting off current flow through SCR 91. Voltage from source 72 is applied instead to the ALARM lamp circuit causing lamp 83 to flash, and applying a positive voltage to the anode of SCR 115, to inverter 155 and NOR gate 147. The output signal from inverter 155 is removed from NOR gate 161 but the latter remains de-actuated because of the presence of the output signal from NAND gate 165. Nor gate 147 becomes de-actuated, causing both NOR gate 149 and inverter 151 to provide output signals. The signal from inverter 151 is delayed before actuating audible alarm 156, and as described above, does not do so unless erroneous information is sent to the computer, or the computer fails to reply correctly. The signal from NOR gate 149 is the START BUS which primes NAND gate 165 in anticipation of reception thereat of the LOCATE CODE signals for module 13, and which also is applied to clock pulse generator 187 which begins to operate. When the scanner count reaches that of module 13 NAND gate 165 is de-actuated permitting the ALARM BUS to be energized at NOR gate 161 and the STOP signal to be energized at inverter 167. The STOP signal stops the scanning cycle and additionally permits transfer of the ALARM BUS to the computer through gate 185. The count in the scanner is also transferred to the computer from converter 191. After delay through element 170 the CLOCK signal actuates AND gate 169 which triggers SCR 171 and de-energizes the START signal. The computer, upon completing its processing of the ALARM BUS and BCD code number, applies the RELEASE signal to clock pulse generator 187 and scanning is resumed, if the START signal is still present, due to another module requesting service.

In the meantime the computer provides a written message at the office of the appropriate authority, indicating the nature of the reported condition (ALARM) and the location, plus other information previously outlined. The reply information is then sent back to the common equipment in the form of the ALARM REPLY BUS and the BCD code number corresponding to that supplied by converter 191 to the computer. The reply code number is applied to converter 195 which, if the code number is correct, actuates AND gate 197 in module 13. Consequently, AND gate 127 is actuated and triggers SCR 115, grounding terminal 86 of ALARM lamp 83 which now provides a steady illumination as opposed to its previous flashing illumination. The positive voltage is removed from NOR gate 147 which is reactuated thereby and prevents actuation of audible alarm 156.

The ALARM lamp 83 remains in its steady illumination condition until the condition of premises 11 changes from the alarm condition. At such time lamp 83 is extinguished and either the normal or trouble mode ensues. The sequence involved upon initiation of the normal mode has been described above. The sequence involved upon initiation of the trouble mode is the same as that for the alarm mode with exception that lamp 81 and its associated circuitry, including inverter 157, NOR gate 163, and AND gate 145 are employed in place of ALARM lamp 83 and its associated circuitry.

Figure 3:
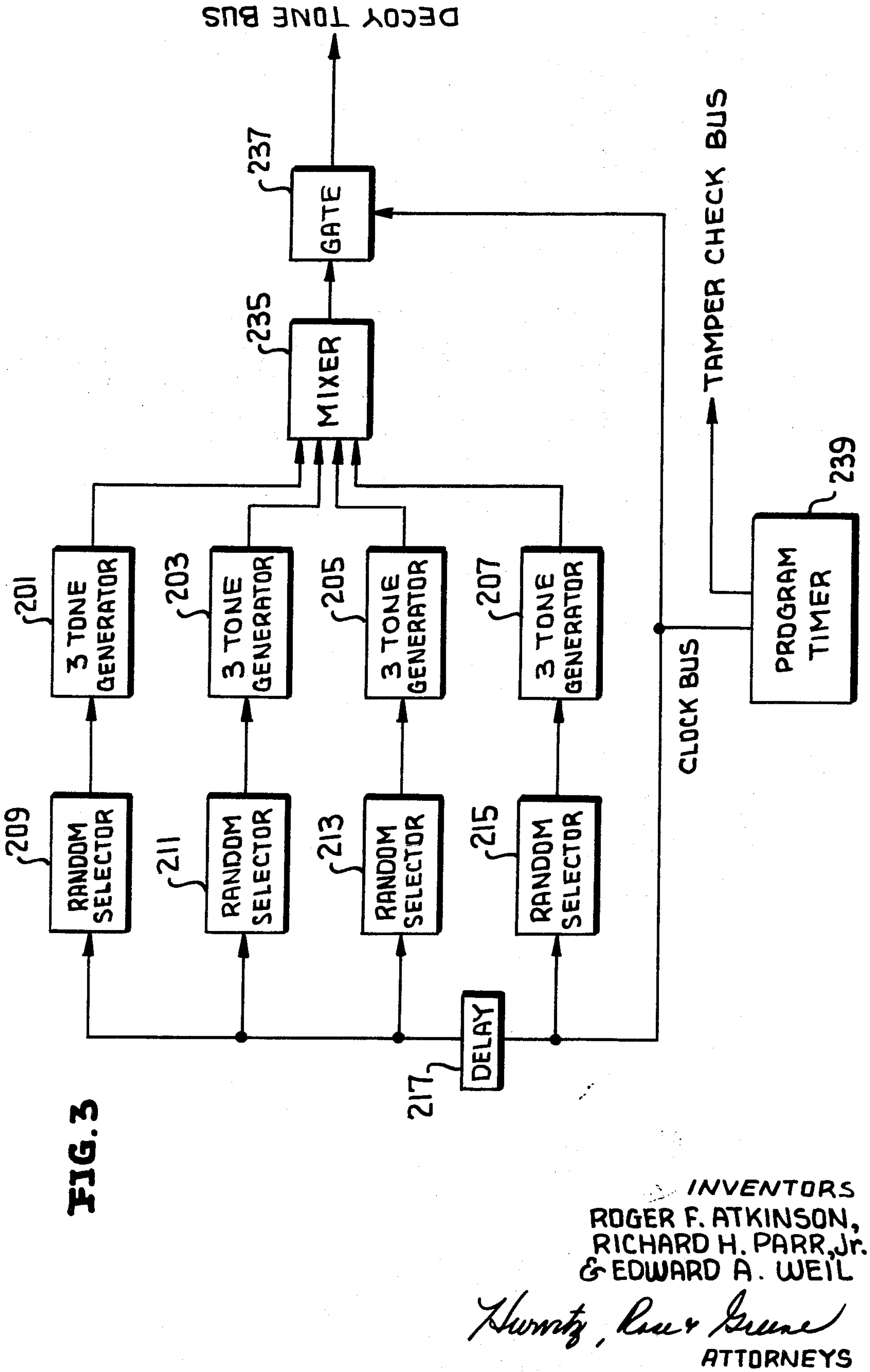
FIG. 3 illustrates a further optional modification for the system in FIGS. 1*a* and 1*b*.

Referring now to FIG. 3 there is illustrated a technique for confusing a criminal who is attempting to defeat the tamper protection system shown in FIG. 2. Part or all of this system may be located in either common equipment 15 or in module 13. Oscillator groups 201, 203, 205, 207 contain three tone generators each. All twelve of these generators oscillate at a different frequency and at a slightly different, ± 5 db, amplitude level from each other. One oscillator from each group of three is selected by random selectors 209, 211, 213, 215 respectively. Delay element 217 delays the clock bus signal for a period of time, on the order of several milliseconds, equal to the average startup time of the code tone generators 37 in FIG. 2.

The random selectors 209, 211, 213, 215 produce an unpredictable output signal each time an input signal is applied thereto. One method of accomplishing this is to gate out the position of a ring counter, which is free running, each time an input signal arrives. The input signal to these random selectors is derived from program timer 239 which produces a periodic repetitive output signal, with a period, for example, such as one second on, one-quarter second off. At random intervals, the output signal of program timer 239 is removed from the clock bus driving the random selectors, and applied instead to the tamper check bus, via circuitry contained in program timer 239, with the same one second on, one-quarter second off timing.

The output signals from the tone generators in units 201, 203, 205, 207 are applied to mixer 235. The output signal of mixer 235 is applied to gate 237. The other input signal to gate 237 is the clock bus from program timer 239. The output signal from gate 237 is applied to the decoy tone bus, which is in turn applied, with appropriate isolation, to all telephone lines 21 and 23 terminated at each module 13.

In operation, the system shown in FIG. 3 serves to confuse anyone attempting to defeat the tamper protection described previously. Program timer 239 causes each random selector 209, 211, 213, 215 to energize only one tone of its associated group 201, 203, 205, 207 of three tone generators. The four tones are then passed to mixer 235, which passes all four on one line to gate 237. Gate 237 passes the four tones to the decoy tone bus when gate 237 is actuated by the clock bus, which also causes the random selection of four tones at various levels. The tones on the decoy tone bus are thence applied to the telephone lines 21 and 23 at their termination in module 13 at the same average level and for the same time as the actual tamper protection tones. Occasionally, at random intervals, program timer 239 does not activate the clock bus, but instead activates the tamper check bus, corresponding to source 47 and switch 49 in FIG. 2, causing the interrogation-response tone sequence described earlier to be carried out.

A person monitoring the phone line 21, 23 would be unable to determine, because of the various levels of the decoy tones, from which end of the line the interrogation and response tones were coming. Furthermore the delay 217 would cause the decoy tones to sound exactly like the real interrogation-response tones inasmuch as three of the decoy tones would be delayed slightly relative to the fourth tone.

Since a person monitoring the telephone line 21, 23 would hear a continuous series of groups of four tones, with each of these tones varying slightly in amplitude with respect to each other, it would be impossible to determine by listening which of the tone groups was the actual interrogation-response group; therefore, it would be impossible to substitute simulated tone equipment for the transponder located in the protected premises 11. The circuit of FIG. 3 therefore prevents defeating of the tamper protection, so that cutting the wires 21 and 23 and committing a crime against protected premises 11 without detection is not possible.

Perhaps the most far-reaching advantage of the system of the present invention is the fact that once the alarm information has been made available to the computer, it can then interface the system information with all other functions which police and fire departments are now or will in the future be implementing with computers. Therefore, optional features of the computer programs may include designation of particular patrol cars in the area of the alarm, automatic selection and notification to the appropriate precinct house or fire station, statistical reporting and analysis of the location, type, and frequency of alarms and phone line troubles, automatic notification of telephone company personnel in the event of phone line trouble, and even direct dispatching of police cars via vocal response unit or digital codes connected to the police radio system.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for providing interface functions between a computer interface, which services a computer capable of providing alpha-numeric readout information at remote locations corresponding to received coded information, and a central station alarm network having a multiplicity of diversely located alarm-protected premises, each of said premises being capable of assuming a plurality of alternative conditions and providing a condition signal indicative of the existing premises condition, said system comprising:

a multiplicity of control circuits, one each for monitoring the condition of a respective one of said premises and each being adapted to receive the condition signals provided by its monitored premises;

actuable scanner means for applying trigger signals to all of said control circuits individually in accordance with a predetermined sequence; and counting means for providing a sequentially changing coded signal to said computer interface identifying each of said control circuits as they receive a trigger signal from said scanner means;

wherein said control circuits each include:

resettable logic means responsive to said condition signal provided by said monitored premises for registering the occurrence and nature of condition changes at said monitored premises, and for providing a status signal to said computer interface indicating the nature of the existing condition at said monitored premises;

triggerable gating means responsive to condition changes registered at said logic means and a trigger signal from said scanner means for providing a control signal to said scanner means to deactuate said scanner means at a point in said predetermined sequence at which said coded signal identifies the control circuit from which said control signal originates, said control signal also being provided to said computer interface as an indication that said status signal originates from the control circuit which is identified by said coded signal;

wherein said computer is programmed to provide a status reply signal and a coded reply signal to said system after said computer has processed said status signal and said coded signal, and has delivered said alpha-numeric information, said coded reply signal identifying the same control circuit identified by said coded signal and said status reply signal signifying the same premises condition as said status signal, and wherein said system further comprises:

decoder means responsive to said coded reply signal for providing a gating signal to the control circuit identified by said coded reply signal;

means for applying said status reply signal to all of said control circuits;

wherein each of said control circuits include reset means responsive to time coincident application of said gating signal and said status reply signal to the same control circuit for resetting the resettable logic means in that control circuit whereby to deregister any condition change registered by that resettable logic means;

said system further comprising a tamper-protection circuit comprising:

selectively actuable interrogation means located remote from said protected premises for supplying a coded interrogation signal to different selectable ones of said protected premises;

transponder means located at various protected premises and responsive to said coded interrogation signal for generating a coded response signal which uniquely identifies the premises from which the coded response signal originates; and a plurality of decoding means each responsive to said coded response signal generated at a respective protected premises for providing a first indication when said coded response signal correctly identifies said respective premises upon interrogation by said interrogation signal and for providing a second indication when said coded response signal incorrectly identifies said respective premises upon interrogation.

2. The system according to claim 1 wherein electrical connections are provided between said protected premises and respective control circuits and wherein said second indication serves as an indication that the system has been tampered with at said protected premises, and wherein said resettable logic means additionally includes means for registering tampering indications and for providing a tamper signal to said computer indicating the existence of said tamper condition.

3. The system according to claim 1 wherein electrical connections are provided between each protected premises and its associated control circuit for conveying said condition signals, said coded interrogation signal, and said coded response signals between said protected premises and said control circuits, and further comprising means for randomly applying simulated coded interrogation signals and simulated coded response signals to said electrical connections in a sequence similar to that in which the true coded interrogation signal and coded response signals occur, said simulated coded interrogation signal having a parameter such that said transponder means is non-responsive thereto.

4. The system according to claim 3 wherein said simulated coded interrogation signal and simulated coded response signals are provided at randomly varying amplitudes.

5. In a central station alarm system of the type wherein each one of multiple remotely located protected premises is electrically connected to a respective control circuit located at a central station and supplies to said control circuit an indication of an alarm condition at said premises, an improved alarm indicator circuit comprising:

indicator means having an active operational mode and an inactive operational mode;

first circuit means responsive to the occurrence of an alarm condition at said premises for alternating said indicator means between said active and inactive modes;

reset means for selectively resetting said first circuit means to place said indicator in said active mode; and means responsive to termination of said alarm condition at said premises for placing said indicator means in said inactive mode;

said system further comprising a tamper-protection circuit comprising:

selectively actuable interrogation means located remote from said protected premises for supplying a coded interrogation signal to different selectable ones of said protected premises;

transponder means located at various protected premises and responsive to said coded interrogation signal for generating a coded response signal which uniquely identifies the premises from which the coded response signal originates; and a plurality of decoding means each responsive to said coded response signal generated at a respective protected premises for providing a first indication when said coded response signal correctly identifies said respective premises upon interrogation by said interrogation signal and for providing a second indication when said coded response signal incorrectly identifies said respective premises upon interrogation.

6. The system according to claim 5 wherein said second indication indicates that the electrical connections between said protected premises and said control circuits have been tampered with, and wherein said control circuits each additionally monitor tamper conditions at their respective monitored premises.

7. The system according to claim 6 further comprising means for randomly applying simulated coded interrogation signals and simulated coded response signals to said electrical connections in a sequence similar to that in which the true coded interrogation signal and coded response signals occur, said simulated coded interrogation signal having a parameter such that transponder means is non-responsive thereto, and said simulated coded response signals having parameters such that said decoding means are non-responsive thereto.

8. A central station alarm system for monitoring alarm conditions ocurring at a plurality of remote locations and employing a computer to expedite transmission of alarm indications and locations to responsible authorities, said system comprising:

a plurality of alarm signaling means, at least one at each of said remote locations, each for transmitting an alarm signal to said central station in response to the occurrence of an alarm condition at its remote location;

a plurality of alarm monitoring means located at said central station, each alarm monitoring means being arranged to receive said alarm signal from a respective alarm signaling means, each alarm monitoring means including:

an indicator responsive to reception of said alarm signal for providing a humanly perceptible alarm indication;

logic means for generating a first signal in response to reception of said alarm signal;

actuable means responsible to a predetermined signal for turning off said first signal; and an interface unit connected between said computer and said plurality of alarm monitoring means and including:

scanner means for sampling said alarm monitoring means in sequence to detect for generation of said first signal at a sampled alarm monitoring means;

means responsive to detection of a generated first signal at a sampled alarm monitoring means for terminating sequential sampling by said scanner means and for transmitting to said computer an identification signal indicating which alarm monitoring means is the source of said detected first signal; and means responsive to reception of a further identification signal from said computer fro transmitting said predetermined signal to said actuable means located in the alarm monitoring means identified by said further identification signal;

and further comprising at said central station:

a selective actuated failure indicator; and circuit means responsive to said first signal and said actuable means for actuating said failure indicator when the time between generation of said first signal and actuation of said actuable means by said predetermined signal exceeds a pre-established time interval;

wherein said indicator is a lamp, each alarm monitoring means further comprising:

means responsive to reception of said alarm signal for flashing said lamp on and off repeatedly at a predetermined frequency; and means responsive to reception of a specified signal from said interface unit for terminating on and off flashing of said lamp and maintaining said lamp on until termination of said received alarm signal;

and wherein said interface unit includes means responsive to reception of said further identification signal from said computer for transmitting said specified signal to the alarm monitoring means identified by said further identification signal;

and wherein interconnection between each alarm signaling means and its alarm monitoring means is via a respective pair of conductors over which said alarm signal is transmitted in the form of a predetermined voltage differential, and wherein zero voltage between said pair of conductors constitutes a trouble signal signifying a trouble condition, said system further comprising:

at each alarm monitoring means:

a trouble lamp;

means responsive to reception of said trouble signal at said alarm monitoring means for flashing said trouble lamp on and off repeatedly;

means responsive to a second specified signal from said interface unit for terminating on and off flashing of said trouble lamp and maintaining said trouble lamp on until termination of said received trouble signal; and means comprising part of said logic means for generating said first signal and a trouble bus in response to reception of said trouble signal;

and wherein said interface unit includes:

means responsive to detection of said first signal and said alarm bus at a sampled alarm monitoring means for transmitting said trouble bus along with said identification signal to said computer; and means responsive to reception of said further identification signal and a trouble reply bus from said computer for transmitting said second specified signal to the alarm monitoring means identified by said further identification signal.

9. The system according to claim 8 further comprising:

means located at said central station for selectively transmitting to said remote locations via said pairs of conductors an interrogate signal having a predetermined characteristic;

at each remote location, means responsive to said predetermined characteristic of a received interrogate signal for transmitting a coded identification signal to said central station via said pair of conductors; and decoding means and a tamper indicator located at each alarm monitoring means, said decoding means being operative to decode the coded identification signals received from said remote locations, said decoding means including means responsive to a time delay in excess of a pre-established interval between transmission of said interrogate signal and reception of a proper coded identification signal for activating said tamper indicator.

10. The system according to claim 9 further comprising means located at said central station for transmitting false interrogation signals to said remote locations over said pairs of conductors during intervals when said interrogation signal is not being transmitted, said false interrogation signals lacking said predetermined characteristic.

11. The system according to claim 9 wherein said interrogation signal is an audio tone and said predetermined characteristic is the frequency of said tone; and wherein said coded identification signal comprises a plurality of audio tones of different frequency, each remote station being identified by the combination of frequencies of its audio tones.

12. The system according to claim 11 wherein said interrogation signal is an audio tone and said predetermined characteristic is the frequency of said tone; and wherein said coded identification signal comprises a plurality of audio tones of different frequencies, each remote location being uniquely identified by the combination of audio tone frequencies.

13. A central station alarm system for monitoring alarm conditions occuring at a plurality of remote locations and employing a computer to expedite transmission of alarm indications and locations to responsible authorities, said system comprising:

a plurality of alarm signaling means, at least one at each of said remote locations, each for transmitting an alarm signal to said central station in response to the occurrence of an alarm condition at its remote location;

a plurality of alarm monitoring means located at said central station, each alarm monitoring means being arranged to receive said alarm signal from a respective alarm signaling means, each alarm monitoring means including:

an indicator responsive to reception of said alarm signal for providing a humanly perceptible alarm indication;

logic means for generating a first signal in response to reception of said alarm signal;

actuable means responsible to a predetermined signal for turning off said first signal; and an interface unit connected between said computer and said plurality of alarm monitoring means and including:

scanner means for sampling said alarm monitoring means in sequence to detect for generation of said first signal at a sampled alarm monitoring means;

means responsive to detection of a generated first signal at a sampled alarm monitoring means for terminating sequential sampling by said scanner means and for transmitting to said computer an identification signal indicating which alarm monitoring means is the source of said detected first signal; and means responsive to reception of a further identification signal from said computer for transmitting said predetermined signal to said actuable means located in the alarm monitoring means identified by said further identification signal;

and further comprising at said central station:

a selective actuated failure indicator; and circuit means responsive to said first signal and said actuable means for actuating said failure indicator when the time between generation of said first signal and actuation of said actuable means by said predetermined signal exceeds a pre-established time interval;

said system additionally monitoring equipment trouble conditions occurring at said remote locations, said system further comprising:

at each remote location, trouble signaling means for transmitting a trouble signal to the alarm monitoring means for that remote location in response to occurrence of a trouble condition;

means at each alarm monitoring means for receiving said trouble signal from the associated remote locations, said alarm monitoring means also including:

a trouble indicator responsive to reception of said alarm signal for providing a humanly perceptible trouble indication;

means comprising part of said logic means for generating a second signal in response to reception of said trouble signal;

means comprising part of said actuable means for inhibiting said second signal in response to said predetermined signal;

means at said interface unit responsive to detection of a generated second signal at a sampled alarm monitoring means during sampling by said scanner means for terminating sequential sampling by said scanner means and for transmitting said second signal and said identification signal to said computer to indicate which alarm monitoring means is the source of said detected second signal; and means responsive to reception of said further identification signal and a trouble reply signal from said computer for transmitting said predetermined signal and said trouble reply signal to the actuable means located in the alarm monitoring means identified by said further identification signal.

14. A central station alarm system for monitoring alarm conditions occuring at a plurality of remote locations and employing a computer to expedite transmission of alarm indications and locations to responsible authorities, said system comprising:

a plurality of alarm signaling means, at least one at each of said remote locations, each for transmitting an alarm signal to said central station in response to the occurrence of an alarm condition at its remote location;

a plurality of alarm monitoring means located at said central station, each alarm monitoring means being arranged to receive said alarm signal from a respective alarm signaling means, each alarm monitoring means including:

an indicator responsive to reception of said alarm signal for providing a humanly perceptible alarm indication;

logic means for generating a first signal in response to reception of said alarm signal;

actuable means responsible to a predetermined signal for turning off said first signal; and an interface unit connected between said computer and said plurality of alarm monitoring means and including:

scanner means for sampling said alarm monitoring means in sequence to detect for generation of said first signal at a sampled alarm monitoring means;

means responsive to detection of a generated first signal at a sampled alarm monitoring means for terminating sequential sampling by said scanner means and for transmitting to said computer an identification signal indicating which alarm monitoring means is the source of said detected first signal; and means responsive to reception of a further identification signal from said computer for transmitting said predetermined signal to said actuable means located in the alarm monitoring means identified by said further identification signal;

and further comprising at said central station:

a selective actuated failure indicator; and circuit means responsive to said first signal and said actuable means for actuating said failure indicator when the time between generation of said first signal and actuation of said actuable means by said predetermined signal exceeds a pre-established time interval;

said system further comprising an alarm tamper proof arrangement comprising:

means located at said central station for selectively transmitting to said remote locations an interrogate signal having a predetermined characteristic;

at said remote locations, means responsive to said predetermined characteristic of a received interrogate signal for transmitting a coded identification signal to a respective alarm monitoring means, said coded interrogate signal uniquely identifying the remote location from which it is transmitted; and decoding means and a tamper indicator located at each alarm monitoring means, said decoding means including means for decoding received coded identification signals and means responsive to a time delay in excess of a pre-established interval between transmission of said interrogate signal and reception of a proper coded identification signal for actuating said tamper indicator.

15. The system according to claim 14 further comprising means for transmitting false identification signals from said central station to said remote location during intervals when said interrogation signal is not transmitted.

16. The system according to claim 14 wherein said interrogation signal is an audio tone and said predetermined characteristic is the frequency of said tone; and wherein said coded identification signal comprises a plurality of audio tones of dirrect frequencies, each remote location being uniquely identified by the combination of audio tone frequencies.

17. In a central station alarm system of the type wherein a plurality of remote alarm signaling locations transmit alarm signals to respective alarm monitors of said central station, said alarm signals being indicative of the occurrence of alarm conditions at said locations, a tamper protection sub-system comprising:

selectively actuable interrogator means located at said central station for transmitting to said remote locations an interrogate signal having a predetermined characteristic;

at said remote locations, means responsive to said predetermined characteristic of a received interrogate signal for transmitting a coded identification signal to a respective alarm monitor, said coded interrogate signal uniquely identifying the remote location from which it is transmitted; and decoding means and a tamper indicator for each alarm monitor, said decoding means including means for decoding received coded identification signals and means responsive to a time delay in excess of a pre-established interval between transmission of said interrogate signal and reception of a proper coded identification signal for actuating said tamper indicator.

18. The system according to claim 17 further comprising means for transmitting false identification signals from said central station to said remote locations during intervals when said interrogation signal is not transmitted.

* * * * *